March 21, 1939.  G. A. HATHERELL  2,151,101
METHOD OF TREATING INGREDIENTS OF A CHEWING GUM BASE AND THE LIKE
Filed Jan. 18, 1937
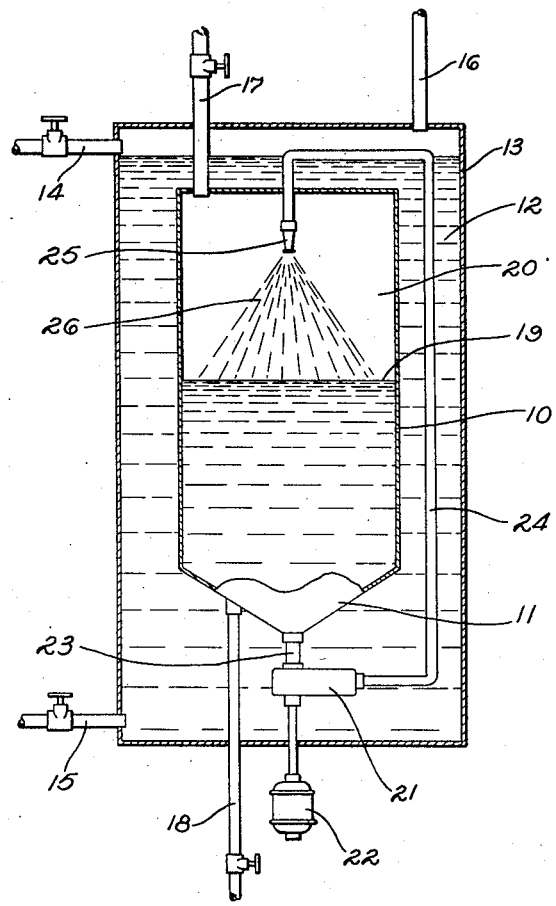
INVENTOR
GEORGE A. HATHERELL
BY HARRIS, KIECH, FOSTER & HARRIS
ATTORNEYS.

Patented Mar. 21, 1939

2,151,101

UNITED STATES PATENT OFFICE 2,151,101

METHOD OF TREATING INGREDIENTS OF A CHEWING GUM BASE AND THE LIKE

George A. Hatherell, Roscoe, Calif., assignor to Frank A. Garbutt, Los Angeles, Calif.

Application January 18, 1937, Serial No. 121,160

11 Claims. (Cl. 99—135)

My invention relates to processes of manufacturing chewing gum and other products, relating especially to the preparation or treatment of organic materials entering into the base compositions of such products, and is directed particularly to process steps to prevent deleterious chemical changes, such changes, for example, as are commonly noted as occurring during the aging of finished chewing gum.

It will be apparent from the present disclosure that my invention is applicable to the treatment of materials variously related to confections and other food products. Since my inventioin, however, is peculiarly valuable in meeting certain pressing problems in the compounding of chewing gum, and will be best understood in relation thereto, the present disclosure will, by way of illustration, be devoted to the treatment of materials used to make a chewing gum base.

Originally, the ingredient for a chewing gum base most widely used was chicle. The supply of this chicle is, however, limited and the price consequently high. To supply the large demand, chewing gum manufacturers have been forced to resort to various chicle substitutes. Among the natural products that have served the purpose of chicle substitutes are jelutong, gutta kay, and gutta hangkang. Rubber and rubber substitutes have also entered into the composition of chewing gum generally in combination with one of the guttas and modified by the addition of such agents as resins and oils.

In the later development of the chewing gum art, various synthetic substances have become prominent as substitutes for chicle, generally in combination with various other substitutes of the types mentioned. The synthetic products include, for example, cumarone resin derived by polymerization processes from coal-tar naphthas, petroleum plastics, such as disclosed in the Merrill Patent No. 1,989,045, and edible synthetic ester resins, as described in the Ellis Patent No. 2,007,965.

The problems with which my process is concerned may arise in the use of any of these ingredients for a chewing gum base, but, for the purposes of my disclosure, I shall describe the application of my process to the treatment of cumarone resin, since this synthetic product is used with remarkable success in compounding a chewing gum base, and the description of such application will serve to teach those skilled in the art how the principles of my discovery may be applied not only to other substances used in chewing gum, but also to the solution of problems elsewhere relating to the general field of edible products.

The term "ingredient" or, more particularly, "gum base ingredient" is to be understood, then, as including any of the above or other substances to which my process is broadly applicable for the purposes that will be apparent as characterizing the present specification. In a more narrow aspect, however, my disclosure is specific to the treatment of cumarone resin as an example of various substances, natural and synthetic, that may be comprehended by the adjective "resinous".

It is fundamental that a base for chewing gum be non-toxic and free of objectionable odor and taste. Many compositions for chewing gum bases have met success to the extent of providing a chewing gum of satisfactory characteristics at the time of manufacture.

One of the most stubborn problems of the art, however, has been the production of a chewing gum that will retain all of its desirable characteristics over the more or less extensive period between manufacture and consumption. The ordinary chewing gums of commerce exhibit a fatal deterioration if kept for more than a few months, even when wrapped in sealed, efficient packages. In some cases, the deterioration affects the physical properties of the gum; for instance, rendering it brittle, granular, or unduly sticky. Other types of deterioration are characterized by the marked changes in taste disagreeable to the user, and it has been found that very small traces of the deleterious products may produce a fatal change in the taste of the gum. These subtle changes that progress in the aging of a chewing gum will hereinafter be referred to as "deleterious reactions".

Because of the extremely complex nature of chewing gum, it would be very difficult to isolate the agents that enter into the deleterious reactions and to analyze the factors involved. Cumarone resin, for example, is of itself a complex composition of organic substances, not all of which have been identified. In the manufacture of synthetic organic materials, as in the polymerization process of manufacturing cumarone resin, the materials acted upon may be subjected to a wide range of conditions resulting in the incidental formation of a corresponding wide range of products of reaction. In the manufacture of cumarone resin and similar products, the greater the extent of distillation the lower will be the penetration and higher the melting point of the final product, and the fewer the number of ingredients in the residuum. In cumarone resin for chewing gum a relatively low melting point is desired, the resin being moderately plastic at not more than 100° C. and preferably at 60° C. to result in smoothness, pleasant resistance and good wearing qualities when the gum is being chewed. This low melting point will be preferably achieved by retaining the concomitant oils and soft resinous bodies of a low melting point resin. The particular cumarone resin preferred, then, for chewing gum manufacture will be unusually complicated because a relatively small proportion of the incidentally foreign products of reaction are removed in the process of manufacture, and, besides the polymers of cumarone, there will be present semi-polymerized substances and other complex materials.

In my copending application Serial No. 701,995, filed December 12, 1933, I disclosed a process including forced oxidation and caustic treatment of the resinous ingredient of a chewing gum base to remove constituents that might later oxidize or otherwise enter into chemical action in the aging of the finished gum, the purpose of the process being to remove or modify constituents that might enter into deleterious reactions in the aging gum. I have found that while this prior process has been commercially successful, especially in chewing gums flavored by relatively stable compounds, such as those of wintergreen, licorice, fruit, lime, cinnamon, etc., the process has been less successful in the prevention of deterioration in chewing gums flavored with the more unstable compounds such as are contained in peppermint and spearmint oils.

In considering deterioration in the aging of chewing gums of the latter type, it is apparent that the problem of identifying the chemical reactions involved is even more complicated than heretofore noted, since such flavoring oils, especially peppermint and spearmint, may include twenty or more distinct and semi-stable compounds which are present in the deterioration period along side the numerous organic constituents of the cumarone resin in the chewing gum base. Whether the particular deleterious reaction associated with these two troublesome flavors involves a catalytic decomposition, reaction, oxidation, or other definite chemical action is not known. Evidently the reaction involved is distinct from other types of deterioration in the aging of chewing gum. Apparently the speed of this latter type of deleterious reaction is a function of temperature, since a gum treated in accordance with my previous process has fair qualities at ordinary room temperatures but at slightly higher temperatures may develop a ruinous bad taste in less than two weeks.

While I admittedly do not know the precise causes or factors of deleterious reaction in the aging of gums flavored with peppermint or spearmint, I do know that the odor-giving constituents of the unrefined cumarone resin are not involved, because such constituents are eliminated by the process of my previous application.

I have been able to make further deductions about this particular type of deterioration by experimenting with alcohol treatment of cumarone resin. For example, I can extract with alcohol about 20% of the weight of relatively soft commercial cumarone resin, separating in this way constituents thin enough to pour, including the oils that largely account for the softness of a low-melting point resin. Incidentally such an extract also contains most of the material responsible for the characteristic odor of cumarone resin. After vacuum purifying and oxidizing the remaining part of the resin, I am able to make therewith a base for chewing gum that would keep its peppermint flavor for about three or four times as long as a chewing gum in which the resin has not been treated with alcohol.

Alcohol extraction as a matter of overcoming deterioration was not indicated, however, because the alcohol extracted desirable softening oils and furthermore, since the impurity or other agent of deterioration was apparently soluble in the resin as well as in the alcohol, it would probably take a large number of successive extractions to remove it entirely from the cumarone.

It is apparent, then, that the basic cumarone resin apart from its softening accompaniments is not responsible for the deterioration phenomenon. On the other hand, it may be further demonstrated that the cause of deterioration in gums flavored with these difficult flavors is not necessarily associated with the softening oils present in low melting cumarone resin. I have extracted a substantial proportion of those oils, treated them according to the process of this application and recombined them with the parent cumarone resin to make successful deteriorization-resistant chewing gum.

An object of my present invention is to eliminate, exhaust, or render inert the constituent or constituents of a gum base ingredient involved in deleterious reactions in the aging of a finished chewing gum; and I also have the further object of providing a process that will be selective in the sense of striking at the cause of deleterious reaction without affecting the desirable characteristics of the chewing gum base ingredient and without removing any constituent, such as softening oils or resins, essential to the finished chewing gum.

I have the further object of providing a relatively simple, rapid, and inexpensive treatment for an ingredient of a chewing gum base that will accomplish substantially everything accomplished by the process of my previous application identified above, in addition to removing the causes of the particular type of deleterious reaction associated with the more complicated flavoring materials, such as peppermint and spearmint.

My present invention is characterized broadly by the conception that the deleterious reaction developed in the aging of a finished product may be anticipated by setting up the identical reaction, or reactions in effect equivalent thereto, in relation to an ingredient of the finished product prior to the introduction of that ingredient into the finished product, thereby eliminating, exhausting, or rendering inert one of the constituents of the ingredient necessary to the deleterious reaction in the finished product. It will be apparent that such a procedure avoids the necessity of isolating or even identifying the causes of the deleterious reaction.

An object of my invention then is to anticipate, prior to the final state of manufacture, those deleterious reactions that otherwise would occur in the finished product and to provide for preventing deterioration in the finished product without the necessity of analyzing or identifying the exact causes of such deteriorations of the agents that enter therein.

In accordance with the conception that I advance, it would be feasible to anticipate deleterious reactions in the finished product by treating the isolated base ingredient with the flavoring oil itself, and then removing the excess flavoring oil and the resultant products from the ingredient prior to compounding the finished product; but such a process would not only be wasteful and expensive because of the high cost of flavoring oils, but also would be cumbersome and slow.

I have as a further object of my invention to substitute in the treatment of the ingredient some relatively inexpensive but relatively active agent for the flavoring matter that enters into the deterioration of the finished product. Whether or not a substance is suitable for such substitution depends upon whether or not it is "chemically similar" to the flavoring material in the sense of reacting with the isolated ingredient to exhaust the factors present in the ingredient necessary for deleterious reaction with the flavoring oil. The phrase "chemically similar", as used in the present specification is to be taken as covering any material or any substance that is analogous in this sense with the flavoring material of the final product.

My process for preventing deleterious reaction associated with a flavoring material and a base ingredient in a finished product may, then, be broadly described as treating the base ingredient with a substance chemically similar to the flavoring material prior to the combining of the base ingredient with the flavoring material. In the particular problem under consideration here, I have found that an aldehyde is chemically similar to peppermint and spearmint oils, not only in the sense stated, but also by virtue of the fact that aldehydes are actually present in mint-type flavoring oils. I shall describe, by way of example, the successful use of formaldehyde for my purpose, but my invention is not to be understood as restricted to formaldehyde, since experiments indicate that other suitable aldehydes may be used, for example, an aliphatic aldehyde, such as acetaldehyde or an aromatic aldehyde such as benzaldehyde.

After discovering the effectiveness of formaldehyde I treated a sample of the oils extracted from the cumarone resin by alcohol and used it to make a deterioration-resistant gum, as heretofore noted. The extracted oil was boiled for five hours in a strong solution of formaldehyde, and the excess formaldehyde was washed out. The treated oil was worked into the cumarone resin from which it had been extracted, and the resultant resin was used in compounding a chewing gum flavored with peppermint. It would be entirely practical to carry out the process of the present disclosure in this manner; first, extracting the cumarone oils, treating them with formaldehyde and reincorporating them into the resin, but I have found that it is entirely practical, and much more simple, to treat the unextracted cumarone resin with the formaldehyde, and that by such means a gum of the desired immunity from deterioration may be produced. Two examples of treatments for the unextracted cumarone resin will be described.

In the first process the cumarone resin is placed in a vacuum purifier, such as used in the process of my previous application, raised to 150° C. and circulated under 25 inches of vacuum. A slow stream of formalin solution is dropped into the circulating mass and the period of treatment is extended over five hours or longer. The formaldehyde vapor and steam produced by the formalin solution sweep out the impurities that vaporize in the same manner as the air stream in the process of my previously noted application.

Since the process described above involves the difficulty of polymerization taking place in the line supplying the formalin solution to the resin, I prefer to use one of the polymerized formaldehydes, as will be noted in the description of a second form of my process.

In this second and preferred form of the process, two pounds of cumarone resin having a melting point of, for example, 60° C. is placed in a heated and sealed chamber with from one-eighth to three-fourths of an ounce of formaldehyde in the form of paraformaldehyde, and the mixture is circulated through a period of from two to five hours, usually four hours. Preferably the volume of the chamber relative to the quantities of material used in the process is such that the pressure, attributable in all probability to the formaldehyde gas, will rise to approximately 20 pounds.

The essential features of an apparatus suitable for this latter process is indicated by the accompanying drawing, well-known elements of the apparatus being conventionally indicated. The figure represents a vertical section through the apparatus with some parts broken away.

A reaction chamber 10 having a conical bottom 11 is submerged in an oil bath 12 heated to a temperature of approximately 150° C., the bath being contained in a suitable outer tank 13. The outer tank 13 is shown with an upper oil pipe 14 and a lower oil pipe 15, and has a suitable vent pipe 16. The reaction materials are fed to the chamber 10 through a valve-controlled supply pipe 17, from above, and the contents of the reaction chamber are drawn off through a suitable lower pipe 18. The quantity of hot resin is such as to rise to a liquid level 19, above which is a space 20 occupied largely by the formaldehyde vapors. A suitable pump 21, driven by a motor 22, is connected to the bottom of the tank by a short pipe 23 and serves to set up circulation from the bottom of the chamber 10 through a vertical pipe 24 to the top of the chamber where the liquid and entrained vapors are discharged from a spray nozzle 25 in the form of a spray 26 directed into the space 20. It is apparent that the arrangement indicated provides continuous agitation, circulation, and intimate contact between the resin and the formaldehyde.

It is believed that the quantity of formaldehyde used is not critical, the only requirement being, apparently, that an excess of formaldehyde be provided for the reaction. In the first process wherein formaldehyde is applied under a vacuum, the vacuum cuts down the effective concentration of the formaldehyde, but the process provides two purifications in one step since simultaneously with the formaldehyde treatment impurities in the gum are vaporized and carried away.

The pressure under which either process is conducted is not critical, since the formaldehyde treatment may be carried out successfully under a vacuum, at atmospheric pressure, or at higher pressures. The virtue of conducting the process under pressure, as described with reference to the apparatus of the drawing, is that the formaldehyde gas is somewhat concentrated and the pressure produced by the formaldehyde gas may be taken as a reliable indication that the required excess of formaldehyde is present throughout the process.

The complex nature of the contents of the reaction chamber makes it very difficult to identify the precise reaction that accounts for immunizing the finished chewing gum to deterioration, and it is not essential to the success of my process that the reaction be known. The cumarone gum has several constituents, as heretofore noted, and formalin, or the aqueous solution of formaldehyde, used in some forms of my process is commonly believed to represent an equilibrium between the monomolecular compound and several of the polymers. At the reaction temperature the paraformaldehyde depolymerizes to active formaldehyde gas and except for pressure, the two processes are identical.

The reaction may include polymerization of the formaldehyde and the deterioration agent in the cumarone gum, or it may include a reduction of the agent by the formaldehyde or a simple reaction between the agent and the formaldehyde. Formaldehyde might enter into all three of these reactions. Nearly the original quantity of formaldehyde is recovered and no change in either the basic cumarone resin or the recovered formaldehyde is revealed by inspection after the reaction.

Whatever the nature of the chemical action, the process is completely successful in immunizing the finished chewing gum to that form of deleterious reaction occurring at above room temperatures and associated with peppermint and spearmint flavors. I have found that the formaldehyde process not only reaches the unknown causes of this particular type of deterioration, but in addition removes all of the causes of deterioration that were successfully obviated by the forced oxidation and caustic treatment of the process of my previous application.

The statement hereinbefore given of my general conception or theory underlying my process indicates the breadth of my invention, and I reserve the right to all departures from my specific disclosure within the spirit of that conception that properly comes within the scope of my appended claims.

I claim as my invention:

1. The method of rendering a base ingredient for chewing gum immune to deleterious reactions with flavoring material in the finished chewing gum, said method comprising: treating the base ingredient with an aldehyde prior to combining the base ingredient with the flavoring material.

2. The method of rendering a base ingredient for chewing gum chemically inert to flavoring oils of the mint type, said method comprising: treating the base ingredient with an excess quantity of an aldehyde; and removing from the base ingredient the excess aldehyde and the products of the aldehyde treatment.

3. The method of preventing deleterious reaction involving a resinous base ingredient and a flavoring oil in a finished chewing gum, said method comprising: treating the resinous base ingredient with an aldehyde having a chemical relationship with the base ingredient similar to the chemical relationship of the flavoring material therewith prior to combining the base ingredient with the flavoring oil.

4. The method of processing a resinous ingredient of chewing gum to prevent deleterious reaction involving a flavoring oil in the finished chewing gum, said method comprising: treating the resinous base ingredient under elevated temperature conditions with an excess of an aldehyde.

5. The method of treating a resinous ingredient of chewing gum to prevent deleterious reaction involving a flavoring oil in the finished gum, said method comprising: agitating a mixture of the base ingredient and an aldehyde over a period of time at an elevated temperature; and separating the base ingredient from the remaining aldehyde and the products of the aldehyde treatment.

6. The method of preventing deleterious reaction involving a flavoring oil and a base ingredient in a finished chewing gum, said method comprising: treating the base ingredient with formaldehyde prior to combining the base ingredient with the flavoring oil.

7. The method of rendering a base ingredient for chewing gum chemically inert to flavoring oils of the mint type, said method comprising: treating the base ingredient with an excess quantity of formaldehyde; and removing from the base ingredient the excess formaldehyde and the products of the formaldehyde treatment prior to combining the base ingredient with the flavoring oil.

8. The method of processing a resinous ingredient of chewing gum to prevent deleterious reaction involving a flavoring oil in the finished chewing gum, said method comprising: treating the resinous base ingredient under elevated temperature conditions with an excess of formaldehyde; and separating the base ingredient from the excess formaldehyde and the products of the formaldehyde treatment prior to combining the base ingredient with the flavoring oil.

9. The method of processing a resinous ingredient of a chewing gum to prevent deleterious reaction involving a flavoring oil in the finished chewing gum, said method comprising: subjecting the resinous ingredient to heat to form a liquid body; superposing on the liquid body a gaseous body of formaldehyde; and setting up circulation from the liquid body through a spray directed into the superimposed formaldehyde.

10. The method of preventing deleterious reaction involving a flavoring oil and a base ingredient in a finished chewing gum, said method comprising: treating the base ingredient with acetaldehyde prior to combining the base ingredient with the flavoring oil.

11. The method of preventing deleterious reaction involving a flavoring oil and a base ingredient in a finished chewing gum, said method comprising: treating the base ingredient with benzaldehyde prior to combining the base ingredient with the flavoring oil.

GEORGE A. HATHERELL.